(12) United States Patent
Hantschel et al.

(10) Patent No.: US 8,484,761 B2
(45) Date of Patent: Jul. 9, 2013

(54) METHOD FOR COST-EFFICIENT MANUFACTURING DIAMOND TIPS FOR ULTRA-HIGH RESOLUTION ELECTRICAL MEASUREMENTS AND DEVICES OBTAINED THEREOF

(75) Inventors: Thomas Hantschel, Houtvenne (BE); Wilfried Vandervorst, Mechelen (BE); Kai Arstila, Leuven (BE)

(73) Assignee: IMEC, Leuven (BE)

( * ) Notice: Subject to any disclaimer, the term of this patent is extended or adjusted under 35 U.S.C. 154(b) by 483 days.

(21) Appl. No.: 12/483,160

(22) Filed: Jun. 11, 2009

(65) Prior Publication Data

US 2009/0313730 A1    Dec. 17, 2009

Related U.S. Application Data

(60) Provisional application No. 61/060,781, filed on Jun. 11, 2008.

(51) Int. Cl.
    *G01Q 70/14*    (2010.01)
(52) U.S. Cl.
    USPC .................. 850/57; 850/33; 850/52; 850/56; 850/59; 850/60
(58) Field of Classification Search
    USPC .................. 850/21, 33, 40, 52, 56, 57, 58, 59, 850/60, 61; 250/306, 307, 309, 310, 311; 382/169, 170, 171, 172, 181, 199
    See application file for complete search history.

(56) References Cited

U.S. PATENT DOCUMENTS

| 6,415,653 | B1 | 7/2002 | Matsuyama | |
|---|---|---|---|---|
| 2002/0117611 | A1* | 8/2002 | Kley | 250/234 |
| 2003/0172726 | A1* | 9/2003 | Yasutake et al. | 73/105 |
| 2004/0228962 | A1* | 11/2004 | Liu et al. | 427/58 |
| 2009/0148652 | A1* | 6/2009 | Carlisle et al. | 428/80 |

FOREIGN PATENT DOCUMENTS

| EP | 0794406 A1 | 9/1997 |
|---|---|---|
| JP | 05-280970 | 10/1993 |
| JP | 10-073607 A | 3/1998 |
| WO | WO 01/77694 A1 | 10/2001 |

OTHER PUBLICATIONS

Extended European Search Report for European Patent Application No. 09075263.5-1528 dated Aug. 26, 2010.
Oesterschulze et al., "Diamond cantilever with integrated tip for nanomachining", Diamond and Related Materials, Elsevier Science Publishers, Amsterdam, NL, vol. 11, No. 3-6, Mar. 1, 2002, pp. 667-671.
Arstila et al., "Microfabricated diamond tip for nanoprobing", Microelectronic Engineering, Elsevier Publishers BV., Amsterdam, NL, vol. 86, No. 4-6, Apr. 1, 2009, pp. 1222-1225.

* cited by examiner

*Primary Examiner* — Nicole Ippolito
(74) *Attorney, Agent, or Firm* — Knobbe Martens Olson & Bear LLP

(57) ABSTRACT

An atomic force microscopy probe configuration and a method for manufacturing the same are disclosed. In one aspect, the probe configuration includes a cantilever, and a planar tip attached to the cantilever. The cantilever only partially overlaps the planar tip, and extends along a longitudinal direction thereof. The planar tip is of a two-dimensional geometry having at least one corner remote from the cantilever, which corner during use contacts a surface to be scanned.

23 Claims, 10 Drawing Sheets

Figure 4(A) PRIOR ART
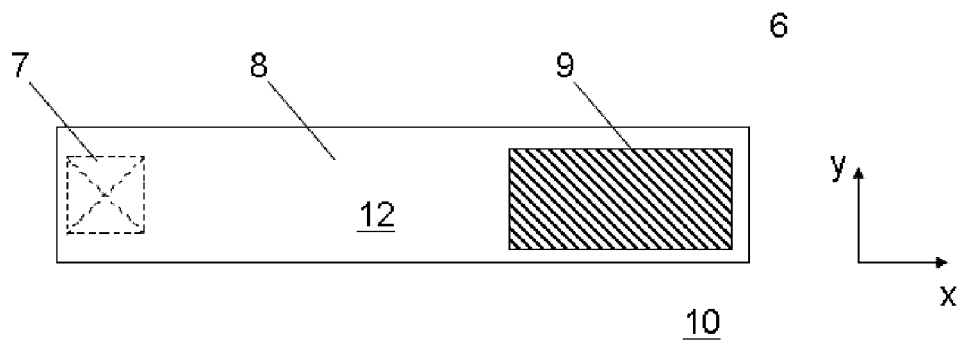
Figure 4(B) PRIOR ART
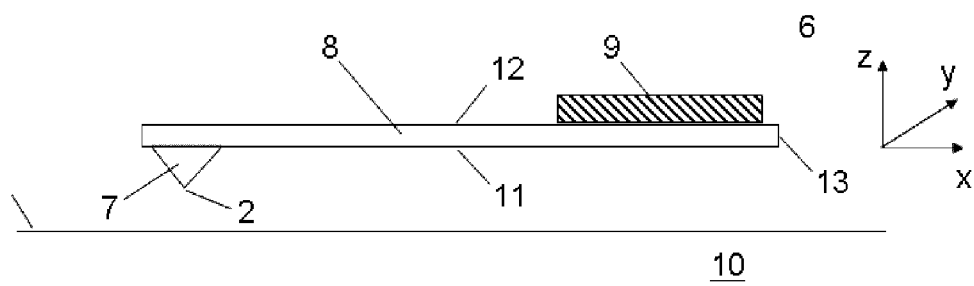
Figure 5(A-F) PRIOR ART
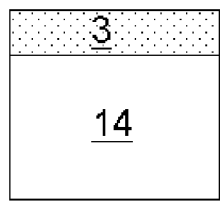
a)
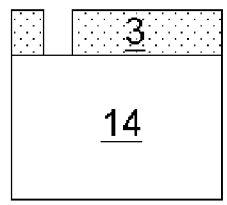
b)
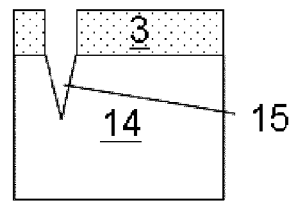
c)
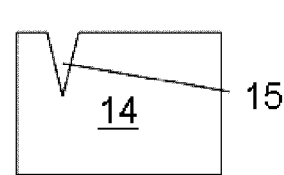
d)
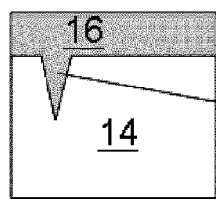
e)
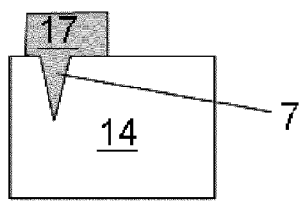
f)

Figure 9
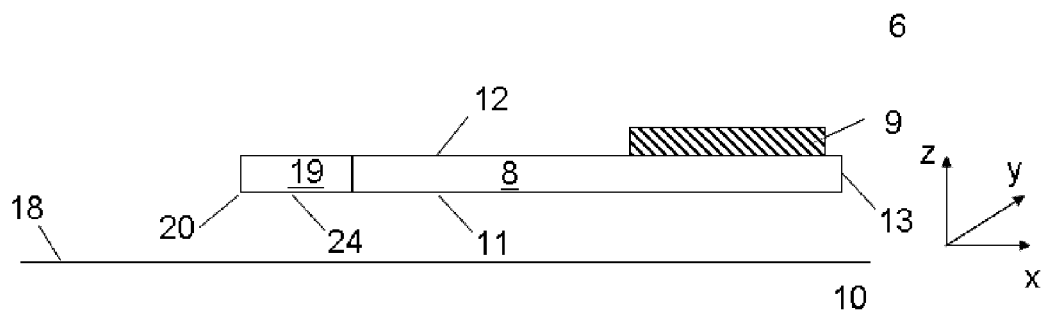
Figure 10
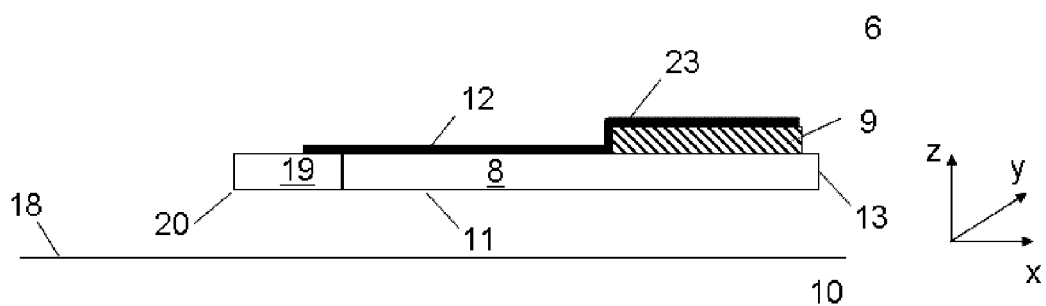
Figures 11(A-B)
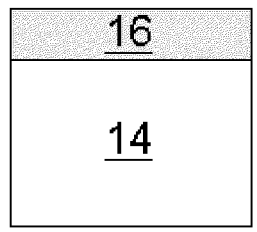
a)
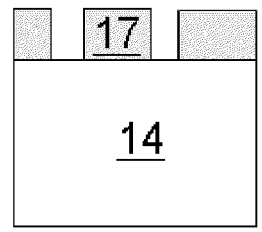
b)

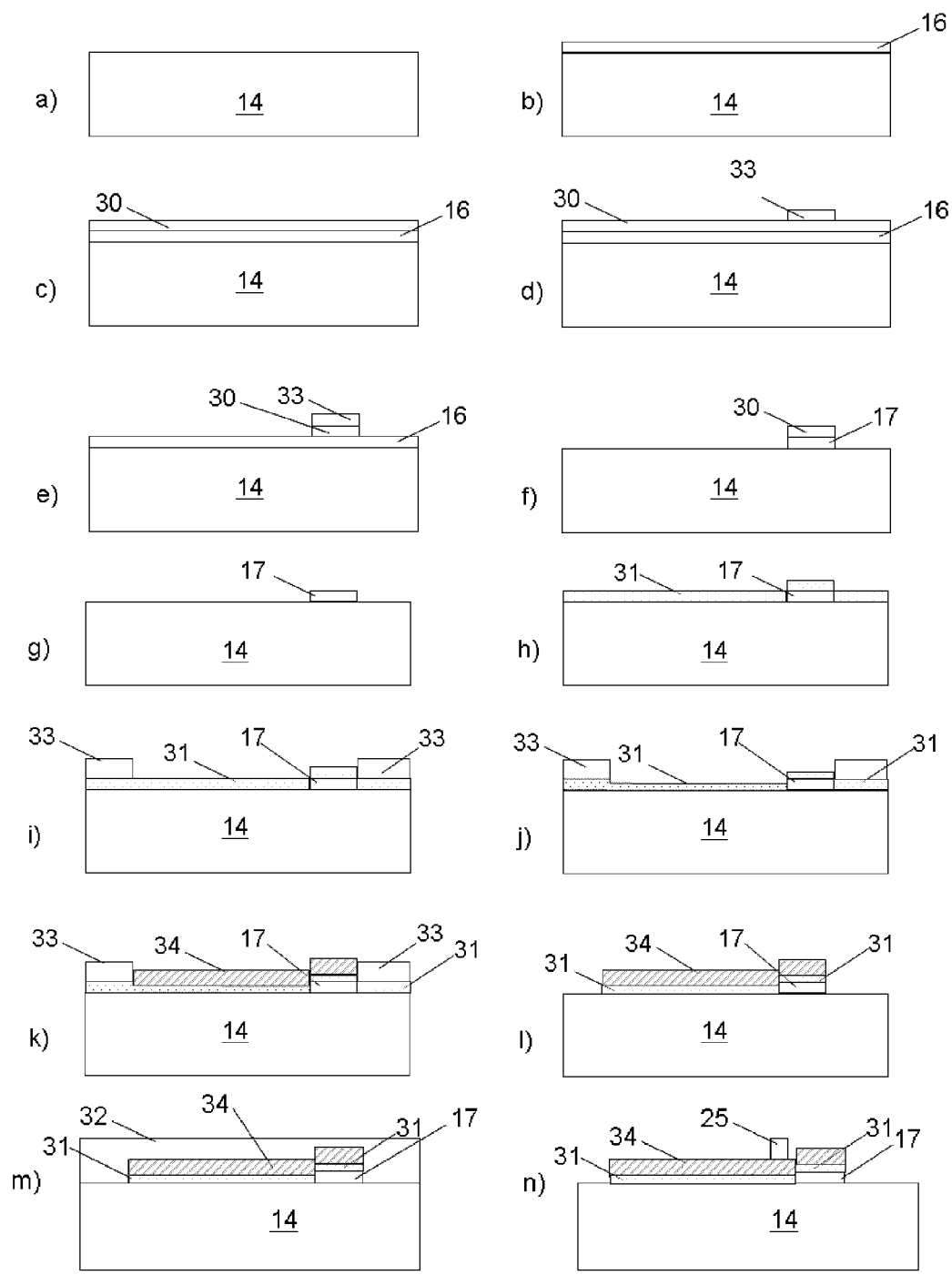
Figure 18(A-N)

Figure 19
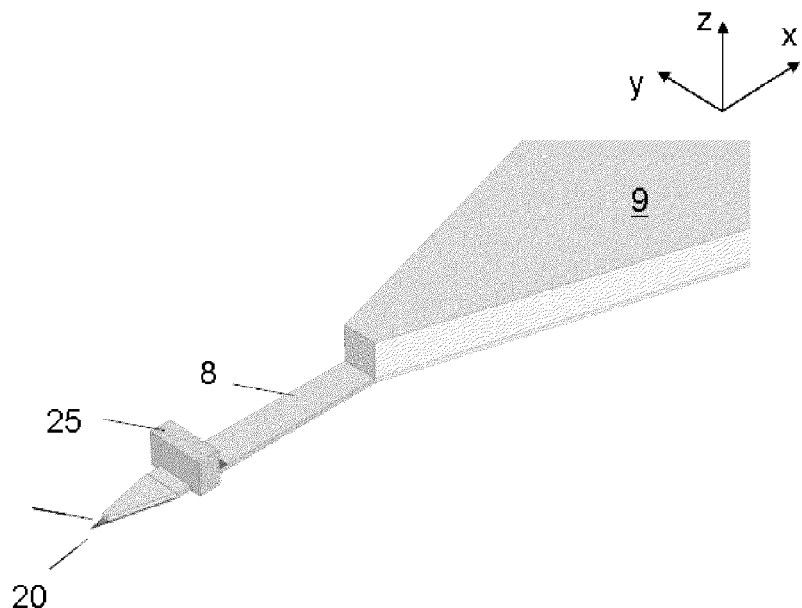
Figure 20(A-B)
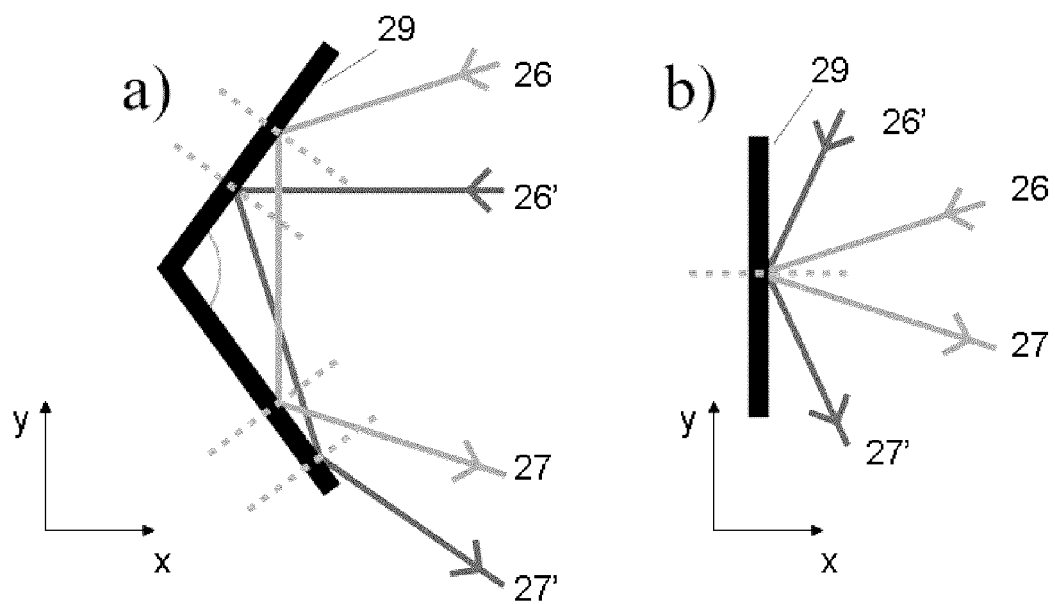

METHOD FOR COST-EFFICIENT MANUFACTURING DIAMOND TIPS FOR ULTRA-HIGH RESOLUTION ELECTRICAL MEASUREMENTS AND DEVICES OBTAINED THEREOF

CROSS REFERENCE TO RELATED APPLICATIONS

This application claims priority under 35 U.S.C. §119(e) to U.S. provisional patent application 61/060,781 filed on Jun. 11, 2008, which application is hereby incorporated by reference in its entirety.

BACKGROUND OF THE INVENTION

1. Field of the Invention

The present disclosure is related to systems for physically characterizing a sample by a probe which is brought in contact with or in close proximity with the surface of the sample. These characterization systems can be a scanning probe system such as a scanning probe microscope, a profilometer or an atomic force microscope. The present invention is in particular related to a probe used in such characterization systems and a method of manufacturing such a probe.

2. Description of the Related Technology

Scanning proximity microscopes or scanning probe microscopes such as an atomic force microscopy (AFM), a scanning tunneling microscope (STM), a magnetic force microscope (MFM), a spreading resistance microscopy (SSRM) probe, operate by scanning the surface of a sample with a probe having a small tip. The probe configuration typically comprises a mounting or holding block to which a cantilever, also known as stylus, is mounted. Attached to this cantilever is a tip, which is pointing towards the sample surface when scanning this surface. This tip preferably has a high hardness and low wear out. The tip and the holding block are mounted to opposite ends along the length of the cantilever. During the scanning of the surface, the sample is moving relative to the tip either by movement of the sample only, by movement of the tip or by a combined movement of both tip and sample.

Such a probe can be used for measuring the topography of the sample's surface by sliding the probe over the surface and monitoring the position of the tip at each point along the scan line. In this application the conductive properties of the tip are less relevant and dielectric or semiconductor materials can be used to manufacture the tip. The probe can also be used for determining the electrical properties of a sample, e.g. the resistance and electrical carrier profile of a semiconductor sample or for nano-potentiometry measurements of the electrical distribution of sample, e.g. a semiconductor sample. For these applications at least the tip of the probe is conductive.

Boron-doped diamond tips are required for two-dimensional carrier profiling of semiconducting devices using scanning spreading resistance microscopy (SSRM) as they provide a highly conductive tip with high hardness and low wear out. The diamond probe therefore remains an essential component for SSRM. Over the past years the SSRM method has been further developed to allow measurements in vacuum, measurements of silicon and III-V semiconducting materials, and measurements of nanowire structures.

A fabrication process for metal cantilevers with integrated diamond pyramidal tips is known. Although an electrical resolution of 1 nm has been demonstrated, this overall process (FIG. 5) suffers from low yield, high manufacturing complexity and high manufacturing cost because a very sharp pyramidal tip is needed. This pyramidal tip is made by a molding technique whereby first a pyramidal etch pit (15) is formed in a supporting silicon substrate (14) by anisotropic etching through an opening in an hardmask (3) (FIGS. 5a-d). This etch pit is then used as a mold and is filled with diamond (16) to create the pyramidal diamond tip (FIG. 5e). The diamond layer is then patterned (17) to form the tip (7) portion of the probe configuration (FIG. 5f). A cantilever (8) is attached to the diamond tip. Thereafter the silicon mould is removed thereby releasing the pyramidal diamond tip and the cantilever attached to it.

This approach for manufacturing diamond probe tips requires a perfectly square patterning of a micrometer sized area (FIG. 1) which requires a lithography stepper and an expensive mask. The required symmetry of the square pattern of a few nanometers can actually not be specified by the mask maker, as the square is 7 microns×7 microns and to pattern that this with nanometer precision is not possible. The use of an etch mask such as silicon oxide layer exposing the underlying silicon substrate, can also cause a non-symmetrical etch pit (1) and as a result a knife-shaped tip (2) (FIGS. 2a-b). Furthermore, particle-like residues (5) are left behind by the anisotropic KOH etching which can remain at the bottom of the tip, i.e. at the position of the apex (2) (FIG. 3). The etch pit is also more difficult to fill perfectly at the bottom with diamond. All these factors together contribute to the low overall yield. Furthermore, the tip is not visible during scanning in SSRM measurements which reduces the tip lifetime as a lot of time is being spent when bringing the tip to the desired area to be measured (FIG. 4). FIG. 4 shows a schematic top (4a) and side view (4b) of a prior art probe configuration (6) comprising a holder block (9) mounted to one main surface (12) of the cantilever (8), while a tip (7) is attached to the opposite main surface (11) of the cantilever (8). The holder block (9) and the tip (7)

Furthermore, the tip is not visible during scanning in SSRM measurements which reduces the tip lifetime as a lot of time is being spent when bringing the tip to the desired area to be measured (FIG. 4). FIG. 4 shows a schematic top (4a) and side view (4b) of a prior art probe configuration (6) comprising a holder block (9) mounted to one main surface (12) of the cantilever (8), while a tip (7) is attached to the opposite main surface (11) of the cantilever (8). The holder block (9) and the tip (7) are located at opposite ends along the longitudinal direction x of the cantilever (8). The tip (7) protrudes in a direction z, perpendicular to the x-y plane of the cantilever the tip as can be seen in FIG. 4b.

Another important problem is the need for a micro-fabricated probe for nanoprober characterization systems. A nanoprober typically comprises a scanning electron microscope for viewing the surface of the sample (10) to be probed or scanned, nanomanipulators comprising the probe configuration for contacting the surface (18) and parameter analyzer(s) for performing electrical measurements of the sample via the nanomanipulators. The tip (22), in particular the apex (2) thereof, is hidden underneath the cantilever and hence the scanned area of the sample (10) is not visible during scanning. Therefore, a lot of time is spent on searching for the region of interest using only the scanned images as references. This leads to early tip wearing and strongly reduces tip lifetime. So far, only manually etched tungsten probes (22) are available as probe tips for the nanoprober (FIG. 6). The tip sharpness is limited to about 20-100 nm. There is a strong need for micro-fabricated tips instead of manually fabricated tips. Moreover alternative materials besides tungsten should be usable as tungsten tips suffers from oxidation. For measurements on silicon for example, conductive diamond probes are needed. The tips should also be sharper to improve resolution of the measurement.

SUMMARY OF CERTAIN INVENTIVE ASPECTS

Certain inventive aspects relate to a probe configuration which allows for ultra high resolution with high yield, which can be manufactured cost-efficiently and where the tip can be seen directly while scanning.

A first inventive aspect relates to an atomic force microscopy probe configuration, comprising a cantilever, and a planar tip attached at least to a sidewall of the cantilever, and extending along a longitudinal direction (x) thereof. The planar tip is of a two-dimensional geometry having at least one corner, remote from the cantilever, which corner during use contacts a surface to be scanned. In one embodiment the planar is triangular shaped.

The planar tip and the cantilever are substantially with in the same x-y plane. The planar tip can be attached to a sidewall of the cantilever. Alternatively the planar tip can be attached to a major surface of the cantilever but such that the cantilever only partially overlaps the planar tip such that the remote corner is not overlapped by the cantilever.

Preferably the planar tip is formed of diamond. At least the remote corner of the planar tip is covered with a diamond layer. From the diamond layer, at least covering planar tip at and around the remote corner, diamond nano-crystallites protrude from the diamond surface.

Preferably the planar tip and the cantilever are formed of the same material.

The probe configuration can further comprise a mirror attached to a major surface of the cantilever whereby the mirror has a reflecting surface perpendicular to this major surface and perpendicular to the longitudinal direction x of the cantilever.

A second inventive aspect relates to methods for manufacturing probe configurations disclosed in the first aspect. The atomic force microscopy probe configuration, according to the first aspect, comprises a cantilever and a planar tip attached to a sidewall of the cantilever and extending along a longitudinal direction (x) thereof. The method comprises providing a flat substrate, forming a planar diamond layer on this flat substrate, forming the planar tip by patterning this planar diamond layer in a two-dimensional geometry having at least one corner, releasing the planar tip from the flat substrate. The method further comprises attaching the released planar tip to a sidewall of the cantilever, such that the at least one corner being remote from the cantilever.

The method can further comprise forming on the flat substrate a layer of a material which can be etched at least selectively to diamond, and wherein releasing the planar tip comprises underetching the patterned diamond layer by etching this selectively removable layer.

Forming the planar diamond layer can comprise forming on the flat substrate a pattern of nanometer-sized diamond particles, growing a diamond layer using these diamond particles as seeds, and forming the planar tip can comprise patterning the diamond layer such that the at least one corner is located at the location of one diamond particle.

The method can further comprise forming a mirror on a major surface of the cantilever, the mirror having a reflecting surface perpendicular to this major surface and perpendicular to the longitudinal direction of the cantilever.

BRIEF DESCRIPTION OF THE DRAWINGS

FIG. 4 is a schematic view of a prior art probe configuration (6) having a tip (7), attached to a cantilever (8) and a holding chip (9) attached to the cantilever (9): (a) top view, (b) side view.

FIGS. 5a-f illustrates a prior art manufacturing process to manufacture the probe configuration shown in FIG. 5 by means of schematic cross section of the process for manufacturing the pyramidal diamond tip (7)

FIG. 9 is a schematic cross-section of a probe tip configuration (6) according to an embodiment.

FIG. 10 is a schematic cross-section of a probe tip configuration (6) according to an embodiment.

FIGS. 11a-b illustrates a manufacturing process to manufacture the probe configuration according to an embodiment by means of schematic cross section of the process for manufacturing the planar diamond tip (19).

FIGS. 18a-n illustrates a manufacturing process to manufacture the probe configuration comprising a planar boron-doped diamond probe tip (19) and integrated microfabricated vertical mirror (25) attached the nickel cantilever (8) according to an embodiment by means of schematic cross section of the process for manufacturing the planar diamond tip (19).

FIG. 19 shows an isometric view of the nickel cantilever (8) with integrated microfabricated vertical mirror (25) and conductive boron doped diamond tip (19) manufactured according to the embodiment illustrated in FIGS. 18a-n.

FIG. 20a-b shows different layouts of the integrated microfabricated vertical mirror (25) according to embodiments: (a) schematic drawing of corner mirror. As the angle between both mirrors is 107.5° (i.e. larger than 90°:90°+17.5°), the reflected laser beam (27, 27') will form in this embodiment an angle of 35° with the incident laser beam (26, 26') whatever the angle of incidence is (b) schematic drawing for regular mirror whereby the angle between reflected (27, 27') and incident laser beam (26, 26') is twice to the angle of incidence.

DETAILED DESCRIPTION OF CERTAIN ILLUSTRATIVE EMBODIMENTS

Figure 1A:
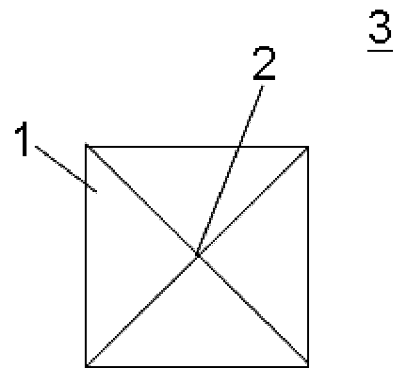
FIG. 1 is a schematic top view drawing illustrating manufacturing problems associated with prior art pyramidal diamond tips: a) a pyramidal etch pit (1) having a point apex (2) needs a perfectly symmetrical etch mask (3) and subsequent symmetrical anisotropic etching, b) a realistic etch pit (1) and the diamond tip formed therein is to some degree always slightly non-symmetrical thereby resulting in knife-shape edges (2) which causes yield reduction.
Figure 1B:
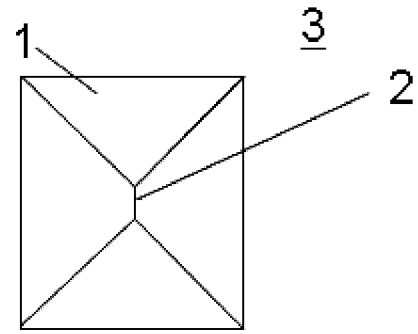
Figure 2A:
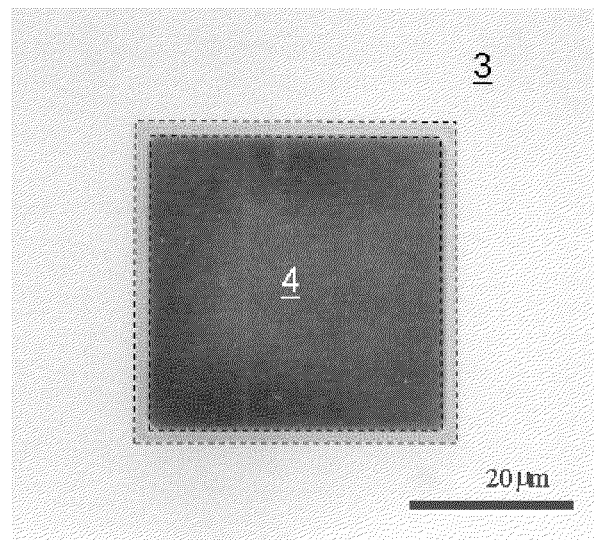
FIGS. 2a-b are top view scanning electron microscope (SEM) pictures showing prior art knife shaped edges of the apex (2) caused by etching: a) the required etch mask (3) exposing the underlying silicon substrate (4) can be underetched non-symmetrically leading to knife shaped edges (2); b) yield reduction of a wafer by formation of knife-shaped edges presented as a pie chart, whereby yield Figures for 3 ranges of knife shape apex (2) are given: 20-50 nm, 50-100 nm, >100 nm. For each range of apex length a SEM picture of a typical apex is inserted.
Figure 2B:
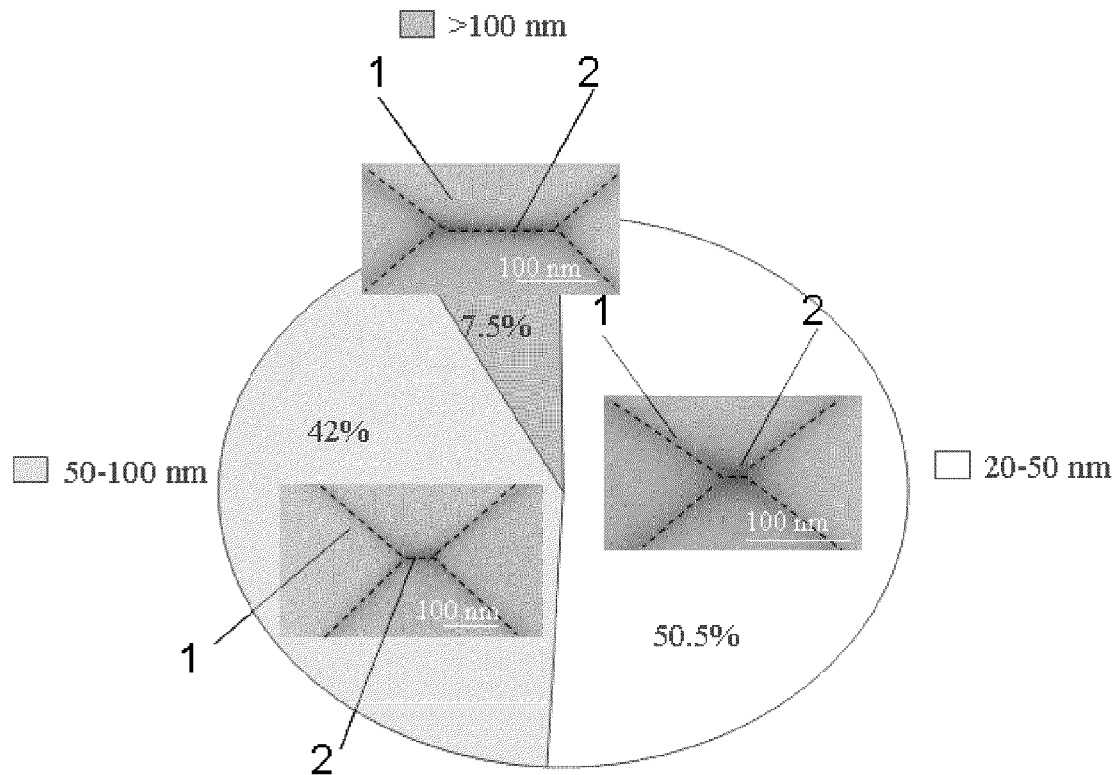
Figure 3:
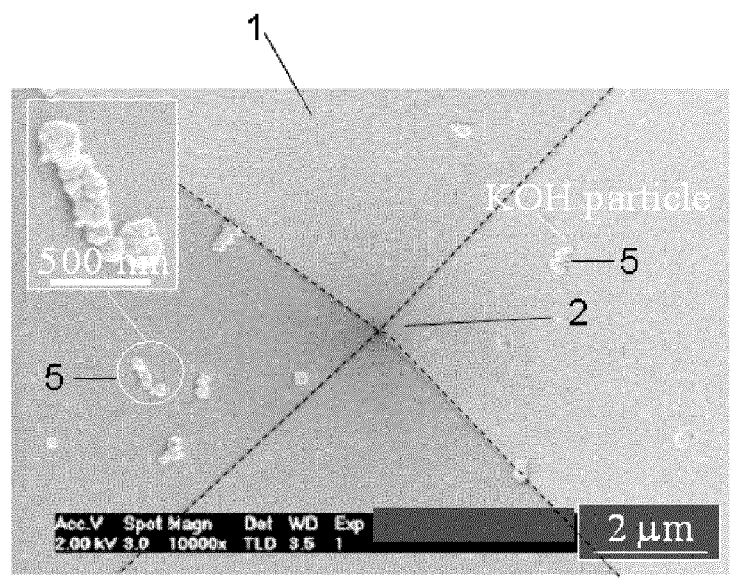
FIG. 3 is a SEM picture showing the top view of a prior art etch pit (1) formed after KOH etching. The KOH etch always leaves traces of materials (5) behind which can accumulate at the apex (2). Wet cleaning can be used to reduce particle concentration but is not perfect. The apex of the pit attracts other particle sources as well.
Figure 6:
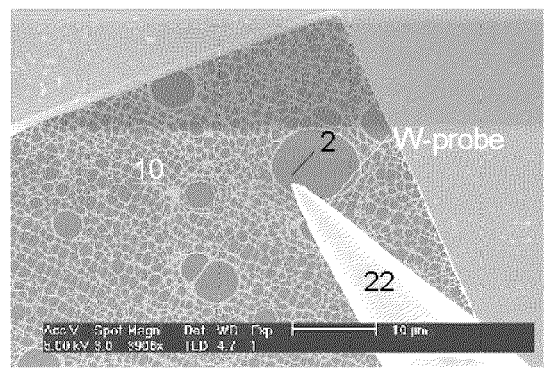
FIG. 6 is a SEM picture of a prior art tungsten probe (22) used in nanoprobing.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

In a first aspect of the disclosure probe configurations are disclosed which overcome the problems of the prior art mentioned above.

Figure 7:
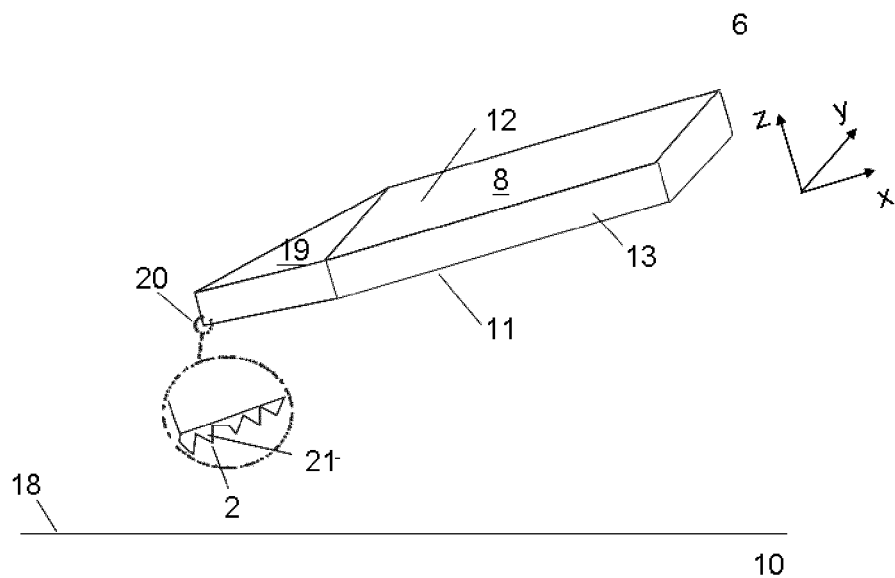
FIG. 7 is a schematic cross-section of a probe tip configuration (6) according to an embodiment disclosing a cost-efficient diamond tip for ultra-high resolution electrical measurements. The holder chip (9) is not shown, but is attached to an extreme end of the cantilever (8) opposite the diamond tip (19). The triangular planar diamond tip (19) is in-plane with the cantilever (8) and is attached to a sidewall (13) thereof. The tip (19) can be seen while scanning. Ultra-high resolution is obtained by diamond nano-crystals (21), having a sharp apex (2), which are sticking out of the diamond tip (19).

Such a probe configuration is illustrated by FIG. 7. The probe configuration (6) comprises a cantilever (8) having a planar diamond tip (19) attached to a sidewall (13) such that the planar diamond tip extends along a longitudinal direction x of the cantilever. The cantilever (8) and the diamond tip (19) are now within the same x-y plane. With a planar diamond tip is meant that the diamond layer (17) of the planar diamond tip (19) has an essentially two-dimensional layout or design without an apex pointing out of this two dimensional x-y plane. When scanning the surface (18) of a sample (10) a main surface (11) of the cantilever and a main surface of the (24) of the tip is facing this sample surface (11). The tip can have any two-dimensional geometry having at least one corner (20) which can be brought into contact with the surface of the sample (10) to be scanned. A triangular planar diamond tip (19) is shown in FIG. 7 and, a polygonal planar diamond tip (19) is shown in FIG. 8.

Figure 8:
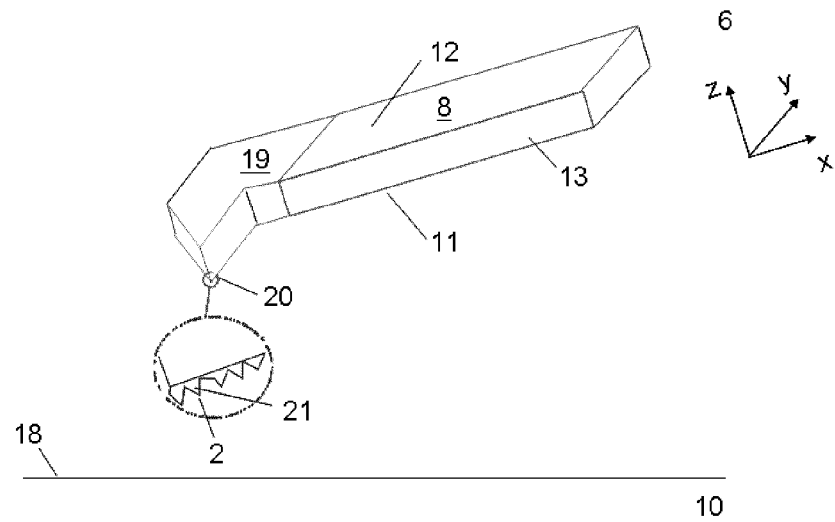
FIG. 8 is a schematic cross-section of a probe tip configuration (6) according to an embodiment disclosing a cost-efficient diamond tip for ultra-high resolution electrical measurements. The holder chip (9) is not shown, but is attached to the other extreme end of the cantilever (8) opposite the diamond tip (19). The polygonal diamond tip (19) is in-plane with the cantilever (8) and is attached to a sidewall (13) thereof. The tip (19) can be seen while scanning. Ultra-high resolution is obtained by diamond nano-crystals (21), having a sharp apex (2), which are sticking out of the diamond tip (19).

As can be seen in FIG. 8 the tapered end of the polygonal diamond tip (19) lies still within the x-y plane of the planar diamond tip (19) and of the cantilever (8). This tapered end (20) is opposite to and not facing the cantilever (8). On this planar diamond tip (19) nano-diamond crystallites (21) are present, preferably near the edges of the planar diamond tip. If a distribution of the nano-crystallites (21) over the main surface (24) of the tip (19) is assumed, the number of crystallites near a corner (20) is limited given the reduced surface available. Although the planar diamond tip (19) can have any two-dimensional shape, preferably the diamond tip (19) has a tapered end with a smaller surface area such that only a limited number of crystallites are present on the tapered end. The smaller the surface of the tapered end, the better as fewer crystallites will be present upon its main surface (24). This way one can assure that during the measurement only one diamond nano-crystal is contacting the surface (18) of the sample (10). Thanks to the very sharp peak (2) of such a diamond nano-crystal (21) an ultra-high electrical resolution of the SSRM measurements is obtained. These micro-asperities (21) constitute a tip having a self assembled sharp apex with subnanometer dimensions.

Whereas the tip (9) is made from diamond providing the desired hardness and low wear, the cantilever (8) can be made of various materials depending on the application. For topography measurements, the diamond tip (6) does not have to be conductive, neither does the cantilever. Hence the cantilever can be made of a dielectric material or from a conductive material. For electrical measurements, e.g. SSRM, at least the diamond tip (19) is made conductive by introducing dopants, e.g. boron, in the diamond layer (16, 17). The cantilever (8) can now be formed of a conductive material, e.g. a metal, thereby providing a conductive path between the tip (19) and the holder block (9) (FIG. 9). If the cantilever (8) is formed in a non-conductive material, then an additional pattern of a conductive material, e.g. a metal stripe (23) is present on top of the cantilever (8) thereby forming an ohmic conductive path between the tip (19) and the holder block (9) (FIG. 10) running over the cantilever (8).

As illustrated by FIG. 7, the diamond tip area (19) has preferentially a triangular shape which can be regarded as a planar tip portion and is patterned by a mask aligner thereby avoiding the need for a high performance lithographic stepper and highly symmetrical pattern as was the case for the pyramidal diamond tip shown in FIG. 4. An ultra-high electrical resolution in the SSRM measurements is obtained by very sharp diamond nano-crystals (21) which are present to the end of the planar tip portion, i.e. at the corner (20) of the triangle remote from the cantilever (8). These nano-crystals (21) can be formed during the diamond layer (16) deposition process.

The surface (14) on which the patterned diamond layer (17) is formed can be a major surface (11) of a cantilever (8) having a tapered end. The cantilever (8) is formed using known techniques and patterned to have a tapered end containing a corner (20). At least on and adjacent to this corner (20) a patterned diamond layer (17) is formed comprising the sharp diamond nano-crystals (21) for contacting the surface (18) to be scanned. Alternatively the cantilever (8) and the diamond layer (16) can be patterned during a single lithographic patterning process whereby the diamond layer (16) covers a main surface (11) of the cantilever (8) including the tapered end (20).

In this embodiment nano-diamond particles (21) are formed during the growth of the diamond layer (16) at the surface opposite the surface of the underlying substrate (14), i.e. the cantilever (8).

In a second aspect of the disclosure, methods for manufacturing probe configurations disclosed in the first aspect are disclosed.

In order to form the diamond layer and crystallites, a diamond film (16) having a thickness from about 0.5 to about 1.5 micron is deposited onto a blanket substrate (14), such as a silicon wafer. No mould is formed in this supporting silicon wafer (14) as no pyramidal tip (1) needs to be formed which points in a direction z perpendicular to the x-y plane of the diamond tip (19). The surface of the substrate (14) on which the diamond layer (16) is formed is flat and even such that a two-dimensional diamond layer (16) is obtained.

Next, the planar tip portion (19) is formed by one patterning process comprising a lithographic resist masking process and dry etching of the diamond film (16) using the resist pattern to obtain the selected two-dimensional geometry of the planar diamond tip (19). Alternatively, an additional hardmask such as aluminum can be used in between resist and diamond for an increased etch resistance during dry etching of the diamond film.

Next, a cantilever portion (8) is patterned by a lithography process and formed by a subsequent deposition process preferably in such a way that it partially overlaps with the diamond tip (19) at a location remote from the corner (20). The cantilever portion (8) is now attached to the planar probe tip (19).

The diamond tip (19) is then released from the silicon wafer (14), e.g. by etching away the silicon wafer (14) in contact with the diamond tip (19). Optionally a layer, e.g. a silicon oxide layer, is present between the supporting substrate (14) and the diamond layer (17) which optional layer allows underetching of the diamond layer (19) for release thereof. This layer can be selectively removed at least with respect to the diamond layer (17). When releasing the planar diamond tip (19) the nanocrystals (21) will be exposed.

The planar diamond tip (19) can be attached to a sidewall (13) of the cantilever (8). Preferably the planar diamond tip (19) is attached to a main surface (11) of the cantilever (8) such that the cantilever only partially overlaps the planar diamond tip (19). In both assemblies the tapered end (20) of the, the tip (19) is not covered or overlapped by the cantilever (8). As the cantilever (8) is positioned aside the tapered end (20) of the planar diamond tip (19), view of this corner (20) is not blocked by that cantilever (8). Because the tip (19) remains visible through the optical microscope of the AFM or through the SEM of the nanoprober when scanning, accurate positioning of the tip is possible which helps increasing the tip lifetime.

The manufacturing yield is increased by reducing the number of critical process required to form the planar diamond tip (19): there is no need for symmetrical pattern to obtain a tip having a sharp corner in contact with the surface, there is no need to form an etch pit (15) with a sharp apex (2), no concern of dirt accumulation inside this etch pit (15) thereby avoiding the need to clean of the pit, and no need for perfect diamond filling at the bottom (2) of the etch pit (15) to obtain a very sharp pyramidal tip (7). The process costs are drastically reduced: fewer process steps and materials are involved, as no etch mask is required to form a mould in the substrate (14), and there is no need for a lithographic stepper and expensive stepper mask (FIG. 7) to control the formation of this etch mask (3). The patterning of the planar diamond tip (19) is only used to obtain the desired two-dimensional geometry of the planar diamond tip (19). The angle of the corners (20) of this planar diamond tip (19) does not have to be very small as this corner is not in contact with the sample surface. The tapering of the planar diamond tip (19) is only to reduce the effective number of crystallites on this tapered end. The contact with the surface to be scanned is through the crystallite present near a corner (20) or on a tapered end of this planar diamond tip (19) and not via edges or corners themselves as was the case in prior art pyramidal diamond tips (7).

A typical process flow is shown in FIGS. 11a-b. The manufacturing process starts with a silicon wafer (14) which is in the first process coated with a diamond layer (16) of about 0.5-1.5 microns thickness. A minimum diamond thickness is needed for the mechanical stability of the tip. If a thinner diamond coating is used, a supporting metal layer might be deposited over the diamond. The maximum diamond thickness is determined by the patterning of the diamond by dry etching (the thicker, the longer it takes to etch it) and the expensiveness of the diamond deposition process (the thicker, the higher the costs). The diamond deposition contains a seeding process whereby the silicon wafer (14) is immersed into a solution which contains nanometer-sized diamond particles which are then deposited onto the silicon wafer. The thus deposited nanometer size diamond particles serve for diamond nucleation in the diamond layer (16) formation process.

The diamond deposition is then carried out by hot-filament CVD (HFCVD) or microwave CVD (MWCVD). In both methods, the diamond is deposited from a flowing gas mixture comprised of typically $CH_4 \leq 1\%$ and $H_2$. The gas is activated with a hot filament (ca. 2200° C.) in HFCVD or a microwave plasma in MWCVD near a substrate heated up to 700-1000° C. The pressure is typically between 10 and 50 Torr. The growth rate is typically about 0.1-1 µm/h. P-type conductivity of diamond is achieved by in situ boron doping using for example diborane ($B_2H_6$) or trimethylborate (($CH_3$)$_3BO_3$) as doping sources. A resistivity of $10^{-2}$-$10^{-3}$ Ωcm can be obtained in this way. High nucleation densities of up to $10^{11}$ cm$^{-2}$ enable the high-density growth of small diamond nano-crystals (up to typically 30-100 nm in size) at the very beginning of the diamond deposition. These nano-crystals are competing with each other in their growth and larger diamond crystals might be formed during the later stages of the deposition. For the intended application, the diamond nano-crystals formed at the very beginning of the deposition are used as nanometer-size tips for electrical measurements (e.g. in SSRM or nanoprobing). Note that these nano-crystals (21) have very sharp edges (2) which cause the nanometer-scale electrical resolution obtained in our measurements.

After diamond deposition, the diamond tip area (19) is patterned (17) thereby using a hardmask and the diamond film is dry etched in an oxygen containing plasma. If the diamond particles used as seeds to form the diamond layer (16) are deposited in a predetermined pattern on the substrate (14), then the diamond tip area (19) is patterned such that the at least one corner (20) of this patterned tip area (19), which will be after attachment to the cantilever (8) remote from this cantilever (8), corresponds to the location of such one diamond particle. In this way the number of diamond particles and hence the number of nano-crystals (21) present at this corner (20) is limited leading to an improved resolution of the AFM or SSRM measurement.

The hardmask is stripped. A metallic seedlayer for plating the cantilever (8) area and holder chip area (9) is deposited. A second hardmask is deposited over this metallic seedlayer and patterned to outline the cantilever and holder area. The seedlayer exposed at the location of the cantilever and holder chip area is then plated, e.g. nickel, to a thickness of typically 2-8 µm. The second hardmask is then removed and the tip (19), cantilever (8) and holder chip area are released from the silicon wafer (14) by etching (e.g. KOH), peel-off or a combination thereof.

A holder chip (9) for convenient probe handling is then attached to the holder area e.g. by gluing or soldering. Note that the holder chip (9) might also be micro-fabricated e.g. plating, deposition of thick organic film on top of the cantilever. Instead of plating a patterned seedlayer the cantilever can be formed by alternative deposition methods e.g. sputtering, evaporation, CVD.

The diamond particles used as a seed for growing the diamond layer (16) can be already be doped. As these diamond particles have already a sharp end such they serve as the nano-diamond crystallites (21) for contacting the surface (18) to be scanned, a subsequently formed diamond layer (16) can be used to embed these diamond particles and to provide a mechanical rigid connection between the different as-deposited diamond particles. This diamond layer then allows manipulating the embedded nano-diamond crystallites (21).

Figure 12:
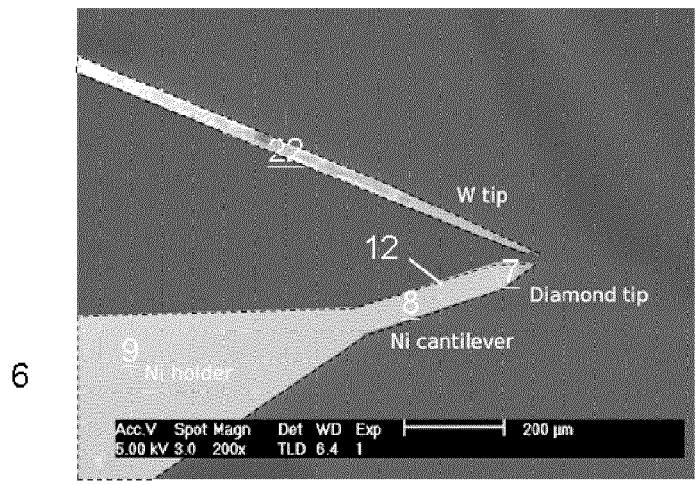
FIG. 12 is a SEM picture comparing a probe configuration (6) according to an embodiment with a prior art manual chemically etched tungsten tip (22). The probe configuration (6) comprises a Ni holder chip (9) attached to a Ni cantilever (8) having a triangular diamond tip (7) at one sidewall. The probe configuration (6) is positioned next to tungsten probe (22) in the nanoprober.

FIG. 12 shows a fabricated prototype of probe configuration (6) according to embodiments. In this particular case, a diamond triangular tip (19) is attached to the longitudinal end (13) of a nickel cantilever (8). FIG. 12 shows a direct comparison of the manually fabricated W-probe (22) and the micro-fabricated nickel cantilever with integrated diamond tip according embodiments.

Figure 13:
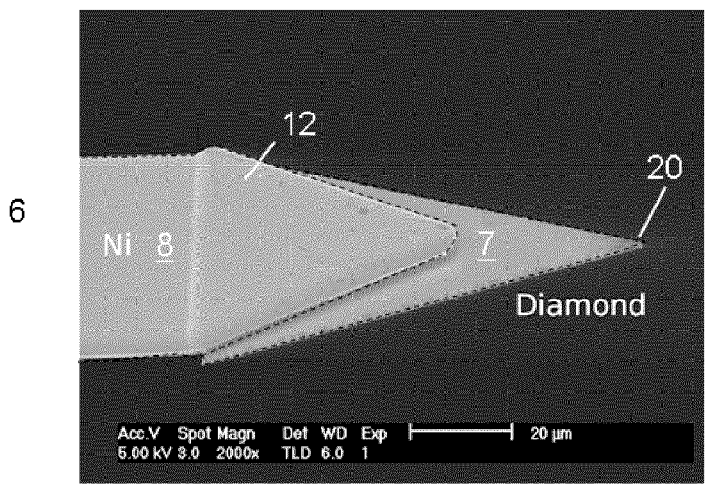
FIG. 13 is a SEM picture showing details of the probe configuration (6) of FIG. 12. Sharp diamond nano-crystals (21) sticking out of the diamond film (17) are used as high-resolution tip. The tapered shape, triangular in this particular case, of the planar diamond tip (19) is avoiding multiple point contacts and helps positioning the tip to the region of interest

FIG. 13 shows the diamond tip of FIG. 12 at a higher magnification. One can see that the triangular diamond tip (19) is formed as a lateral extension of the two-dimensional cantilever (8) as to have a tapered end along its longitudinal direction.

Figure 14:
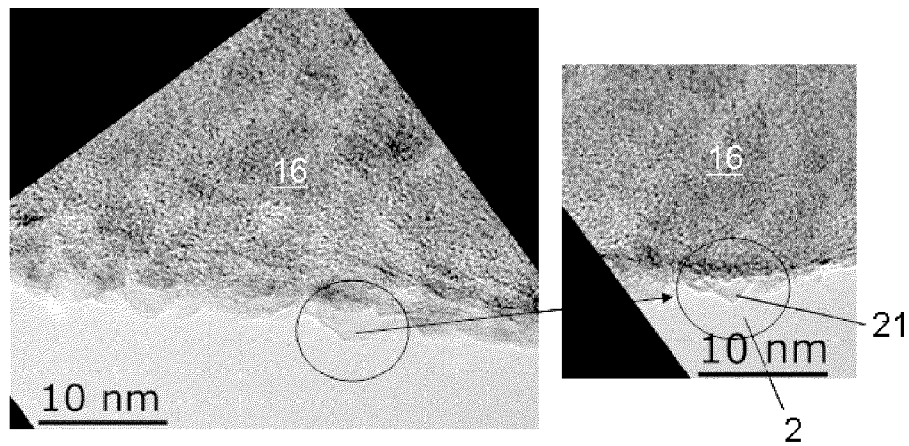
FIG. 14 is a TEM picture showing a Diamond film (16) according to an embodiment. Small diamond nano-crystals (21) having a sharp peak (2) are sticking out of the diamond film thereby giving the high resolution obtained in the electrical measurements.

FIG. 14 shows a TEM image of the diamond film (16) indicating that nanometer-scale sharp diamond crystals (21) are sticking out of the diamond film. These crystals are giving the high resolution in the measurements.

Figure 15:
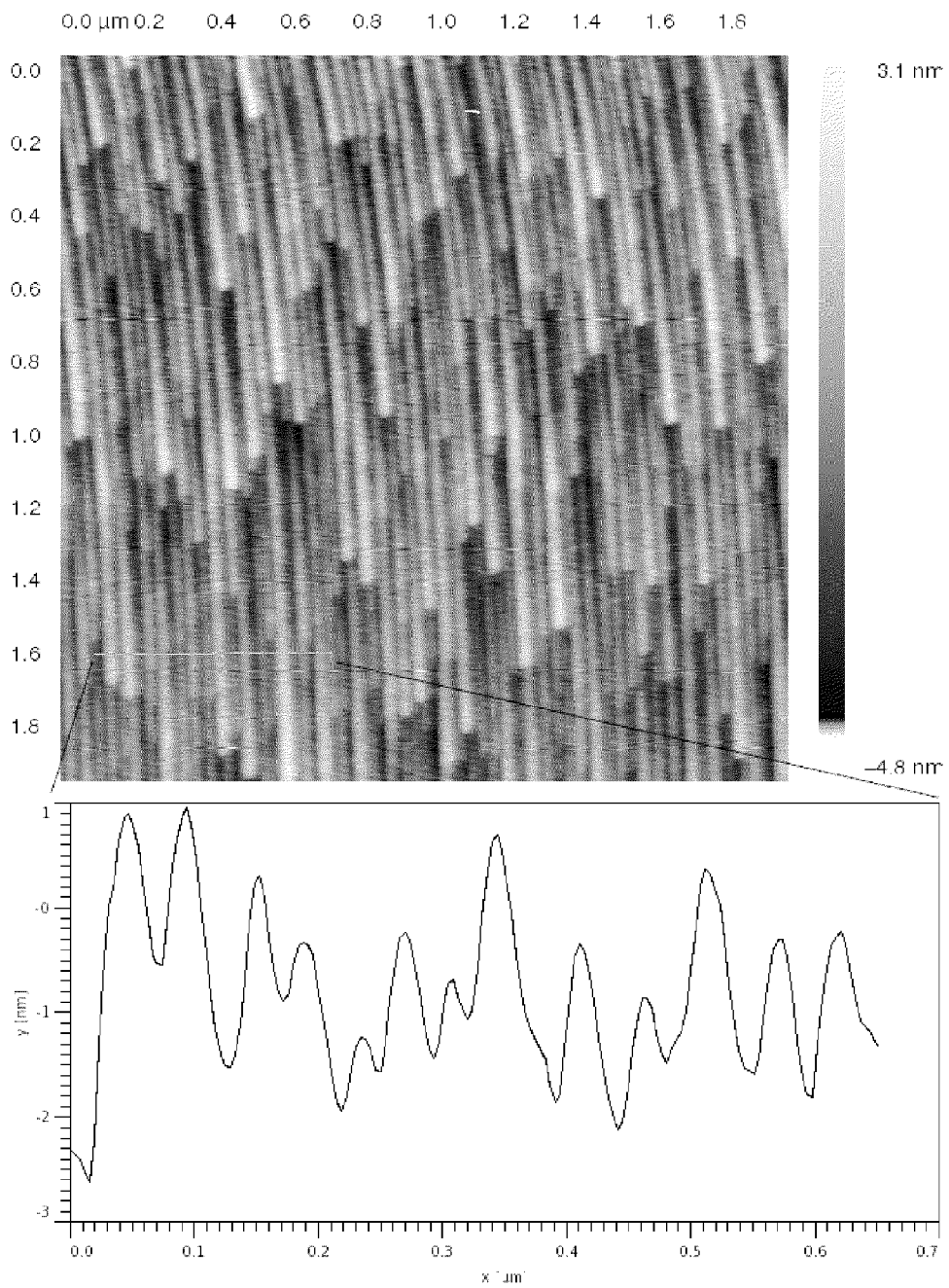
FIG. 15 shows an AFM picture of a $SrTiO_3$ reference sample (10) scanned in a non-contact AFM mode using a diamond tip (19) fabricated according to an embodiment. The needle-like surface of the $SrTiO_3$ reference sample can be imaged with very high resolution illustrating the high resolution of the diamond tip (19).

FIG. 15 is illustrating the attainable topographical resolution of these tips. A SrTiO3 surface was scanned in non-contact mode in AFM using a planar diamond tip alike the one shown in FIGS. 13 and 14. Note that the spaghetti-like structure is only visible with a very sharp tip.

Figure 16:
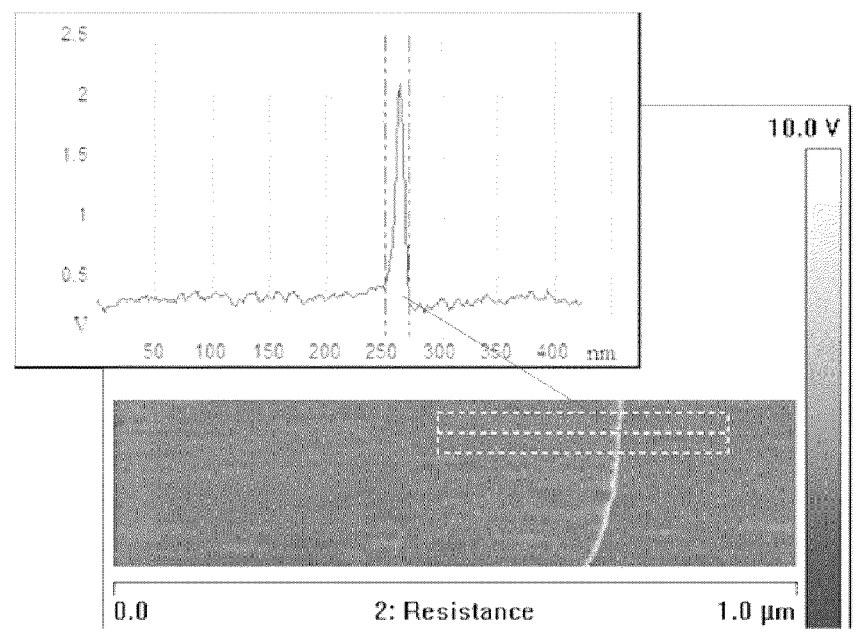
FIG. 16 shows a SSRM measurement of a scanned surface (18) having an oxide line (24) thereby using a planar diamond tip (19) according to an embodiment.

FIG. 16 is an example of an electrical measurement with a fabricated prototype. The 2.5 nm wide silicon oxide line (24) on the scanned surface (18) can be clearly imaged by the diamond tip (19).

The probe configurations disclosed in here can be used in scanning proximity microscopes or scanning probe microscopes such as an atomic force microscope (AFM), a scanning tunneling microscope (STM), a magnetic force microscope (MFM), or a spreading resistance microscope (SSRM) The probe configuration (6) then typically comprises a mounting or holding block (9) to which the cantilever (8) is mounted. Attached to this cantilever is the tip (7), which is at an angle towards the surface (18) of the sample to be scanned. This tip preferably has a high hardness and low wear. The tip (19) is mounted to a sidewall (13) of the cantilever (8) while the holding chip (9) is typically mounted at a major surface (12) of the cantilever opposite the surface (18) to be scanned. During the scanning of the surface (18), the sample is moving relative to the tip (19) either by movement of the sample only, by movement of the tip or by a combined movement of both tip and sample.

Such a probe can be used for measuring the topography of the sample's surface by sliding the probe over the surface and monitoring the position of the tip at each point along the scan line. In this application the conductive properties of the tip are less relevant and dielectric or semiconductor materials can be used to manufacture the tip. The probe can also be used for determining the electrical properties of a sample, e.g. the resistance and electrical carrier profile of a semiconductor sample or for nano-potentiometry measurements of the electrical distribution of sample, e.g. a semiconductor sample. For these applications at least the tip of the probe is conductive.

Figure 17A:
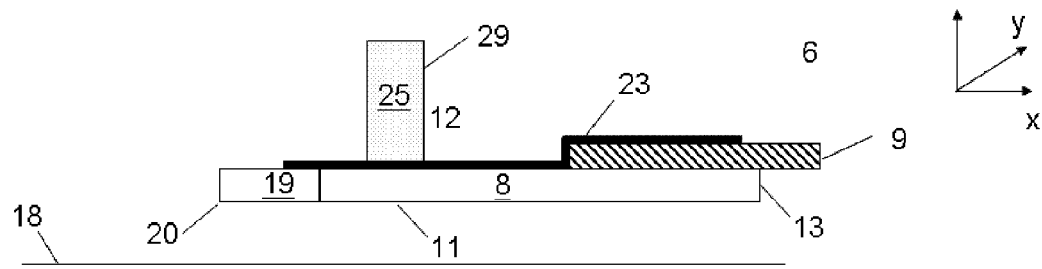
FIGS. 17a-b illustrates an embodiment where a mirror (25) is present on the major surface (12) of the cantilever (8) at which surface also the holder chip (24) is attached: a) sideview, b) topview.
Figure 17B:
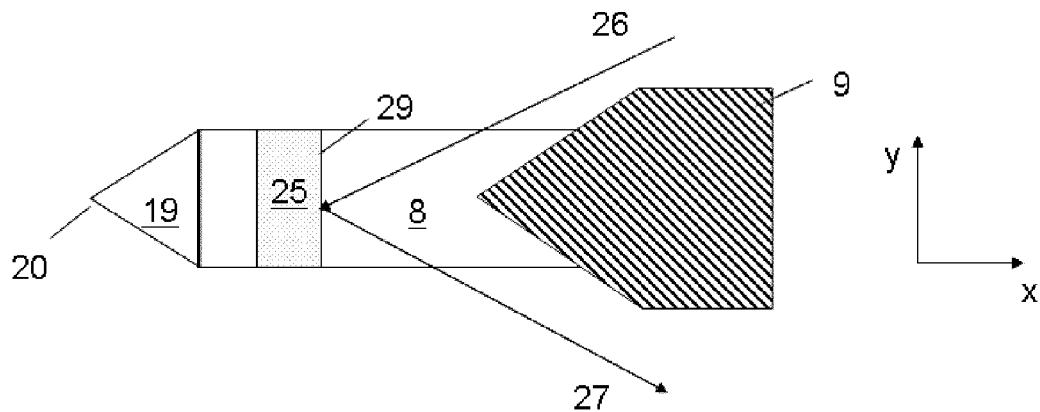

FIGS. 17a-b illustrates another embodiment of an AFM probe configuration (6). As in the other embodiments, the probe configuration (6) comprises a planar probe tip (19) attached to a sidewall (13) of the cantilever. The planar probe (19) has a two-dimensional pattern, e.g. a polygon such as illustrated in FIG. 8 or a triangle such as illustrated in FIG. 7, whereby at least one corner (20) of this two-dimensional pattern is remote from the cantilever (20). On the major surface (12) of the cantilever (8), which major surface (12) is during use not facing the scanned surface (18) of the sample (10), the holder chip (9) is attached. In this embodiment on this major surface (12) a plane mirror (25) is formed adjacent to the probe tip (19). The reflecting surface of the mirror is orthogonal to this major surface (12) such that a laser beam (16) incident on this mirror (25) parallel to this major surface (12) is reflected by this reflecting surface parallel to this major surface (12). As illustrated in FIG. 17b the reflecting surface of this mirror (25) is oriented towards the holder chip opposite the probe tip (19). The mirror (25) is perpendicular to the longitudinal direction x of the cantilever (8) such that its optical axis is along this longitudinal direction x.

An advantage of a probe tip configuration (6) according to this embodiment is that it allows the positioning multiple probe tip configurations (6) close to each other as the cantilever holders (9) are made with a triangular shape which narrows in the direction of the probe tip (19). To be able to use several of these probes simultaneously, the incident and the reflected laser beams is directed parallel to the probe plane. The triangular shape of the cantilever holder allows passage of incident (26) and reflected (27) laser beam in a direction in an x-y plane which is not perpendicular to but preferably planar to the plane (12) of the cantilever (8). In this configuration the deflection of the cantilever (8) during use is not measured by having a laser beam (26) incident on the major surface (12) of the cantilever (8) opposite the scanned surface (18) of the sample (10) in a direction which is perpendicular to, or at least under an angle, to this major surface (12) whereby the reflective surface (12) of the cantilever would reflect (27) this laser beam in a direction perpendicular to, or at least under an angle, to this major surface (12). Instead these laser beams are substantially parallel to this major surface (12) such that the laser source can be positioned away from the area in which the probe tips (19) are contacting the scanned surface (18). Preferably the laser source is located on or behind the holder chip (9) such that the generated laser beam (26) travels from or from behind the holder chip (9) towards the probe tip (19) and are reflected by the intermediate mirror (25) back to or behind the holder chip (9).

Another embodiment relates to a method for fabrication the mirror probes (6) comprising a planar diamond probe tip (19) attached to a cantilever (8) to which also a vertical mirror (25) is attached starts with a blank 200 mm silicon wafer (14) with a [100] crystal orientation (FIG. 18*a*).

First, a 1:4 µm thick conductive boron-doped polycrystalline diamond layer (16) is deposited on the silicon wafer (FIG. 18*b*). The diamond layer is covered with a 500 nm protective aluminum layer (30) that will be used as a diamond etchant mask (FIG. 18*c*). Resist (33) is spun over the wafer (S1828 positive tone photo resist) and exposed using a first mask having the pattern (17) of the probe tip (19). After development, a patterned layer (triangular areas) of resist is left on the aluminum layer (FIG. 18*d*). The unprotected aluminum is removed using a H3PO4 wet etch. Hence, the wafer now contains triangular areas of aluminum and resist over the diamond layer (FIG. 18*e*). Using plasma etch, the unprotected diamond is removed, resulting in triangular diamond tips (19) protected by aluminum (the resist on the aluminum is removed during plasma etching)(FIG. 18*f*).

The remaining aluminum on the tips is removed using a second H3PO4 wet etch (FIG. 18*f*), resulting in a silicon wafer (14) with diamond tips (19) (FIG. 18*g*).

For the cantilever (8) fabrication, a metal stack (31) consisting of three layers; 30 nm of tantalum nitride, 50 nm of copper and 30 nm of titanium is sputter deposited on the wafer (FIG. 18*h*). Tantalum nitride serves as an adhesion layer for copper, copper serves as a seed layer for nickel electroplating and titanium serves as a protection layer to avoid oxidation of the copper layer. A thick layer (>7 µm) of AZ10XT resist (33) pun over the wafer, exposed with a second mask having the pattern of the cantilever (8) and developed. The result is a patterned resist layer with open areas where the cantilevers will come (FIG. 18*i*).

The protective titanium layer is removed using a 2% diluted HF solution (FIG. 18*j*) and immediately after, 7 µm of nickel (34) is electroplated on the copper seed layer (FIG. 18*k*).

The AZ10XT resist (33) is removed (stripped), the remaining titanium layer is removed using a 2% HF solution and the remaining underlying copper layer is removed using a (NH4)S2O8 wet etch (FIG. 18*l*).

The result is a wafer (14) that contains nickel (34) cantilevers (8) with integrated diamond tips (19).

The mirror (25) fabrication starts by spinning a thick layer (32) (50 µm) of negative tone KMPR resist (FIG. 18*m*). The resist is exposed using a third mask having the pattern of the mirrors (25) and developed such that patterned rectangular structures are fabricated on the cantilevers (FIG. 18*n*).

The result is a wafer (14) that contains the nickel cantilevers (8) with KMPR mirrors (25) on top.

Using a similar process as for the fabrication of nickel cantilevers, the holder chips (9) are electroplated from nickel using a wafer (14) with patterned resist (such as the process in FIG. 11*h* to FIG. 18*l*).

The chips are released from the wafer (14) using a silicon under etching technique. The silicon wafer (14) with the chips is placed into a KOH solution, which acts as an anisotropic etchant to silicon. The silicon wafer (14) is left in the solution until it is completely etched so that the chips are released and can be filtered out of the solution. The probes are released using the same technique.

As KOH is an anisotropic etchant to silicon, silicon etching rates depend on the crystal orientation. As the probes are placed on the wafer according to the crystal plane with fastest etching rate (rotated 45°), silicon etching will occur faster under the probes. If the etching process is stopped as soon as the cantilevers are under etched, the probes will stay in position but can be easily released without damaging the cantilevers or the diamond tips.

Finally, the probes are manually released from the wafer using a peel-off strategy in which the probes are literally peeled off the wafer using a pair of fine tweezers.

The holder chip is glued on the cantilever substrate using standard cyanoacrylate glue, better known as superglue. A droplet of silver paste is put on the back of the probe to create an electrical contact between the cantilever substrate and the holder chip, as the glue is not electrically conductive.

As indicated in FIG. 19, the probe configuration (6) consists of a macroscopic holder chip (9) glued onto the cantilever substrate with the cantilever (8) at its end. A sharp (20) conductive boron doped diamond tip (19) is attached at the end of the nickel cantilever (8) for establishing a good electrical contact and a reflective mirror (25). Preferably the reflective mirror (25) is microfabricated from KMPR resist, a permanent negative photo resist.

Different mirror lengths can be used ranging as wide as the cantilever (8), e.g. 0.50 um, to double the cantilever's width, e.g. 100 µm. It is expected that larger mirrors (25) will facilitate aiming the laser system providing the incident laser beams (26, 26'). However larger mirrors (25) introduce more weight to the cantilever and increase the risk of damaging the probe when released from the wafer.

Standard mirrors consist of a flat surface which reflects the incident laser beam according to twice the angle of incidence as illustrated in FIG. 20*a*. Unfortunately, it can happen that the probe configuration (6) with the mirror (25) is not aligned perfectly perpendicular to the probe holder, so that the angle of incidence changes. As a result, the angle of reflection will change accordingly, hence moving the reflected laser beam out of range for the detector which detects the reflected laser beams (27, 27'). This means that the direction into which the laser beam is reflected (27, 27') is very sensitive to a misalignment of the mirrorprobe (25) to the laser system.

In one embodiment, a better solution is a so-called corner mirror, as indicated in FIG. 20*b*, in which the incident laser beam (26, 26') is reflected on two surfaces, positioned at a predefined angle relative to each other. The angle between the incident (26, 26') and the reflected laser beam (27, 27') is now pre-defined by the design, whatever the angle of incidence is. Like for the planar mirror shown in FIG. 20a, the two reflective sidewalls of the corner mirror are vertical to the surface (12) of the cantilever (8), but at an angle towards the longitudinal direction x of the cantilever. The two sides of the corner mirror are at angle α which is larger than 90°. This mirror configuration results in a much more robust design which is less sensitive to alignment errors of the laser system providing the incident laser beam (26) to a detector system detecting the reflected laser beam (27). As the above, the laser system and detector system are positioned along the longitudinal direction x away from the planar probe tip (19), preferably at a position opposite the probe tip (19), e.g. on or behind the holder chip (9).

FIG. 20b shows a schematic drawing of an corner mirror. As the angle between both mirrors is 107.5° (i.e. larger than 90°:90°+17.5°), the reflected laser beam (27, 27') will form in this embodiment an angle of 35° with the incident laser beam (26, 26') whatever the angle of incidence is.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention.

LIST OF REFERENCE NUMBERS 1 pyramide
2 apex
3 hardmask
4 silicon substrate
5 particle
6 probe configuration
7 tip
8 cantilever
9 holder chip
10 sample
11 1st major surface cantilever
12 2nd major surface cantilever
13 sidewall cantilever
14 supporting substrate
15 etch pit
16 unpatterned diamond layer
17 patterned diamond layer
18 scanned surface of sample
19 planar tip
20 corner planar tip
21 nanocrystals diamond
22 W probe
23 metal layer
24 main surface of the tip
25 mirror perpendicular to the cantilever
26, 26' incident laser beam
27, 27' reflected laser beam
29 reflecting side of the mirror 25
30 Aluminum layer
31 Metal stack
32 KMPR resist
33 Resist
34 Nickel

What is claimed is:

1. An atomic force microscopy probe configuration, comprising:
a cantilever; and
a planar probe tip attached at least to a sidewall of the cantilever and extending along a longitudinal direction, of the cantilever, the probe tip having a substantially planar bottom surface and a substantially planar top surface substantially parallel with the bottom surface, the bottom surface having a corner which is configured to contact a surface to be scanned, the top and bottom surfaces of the probe tip having substantially the same two-dimensional geometry and substantially the same size.

2. The probe configuration according to claim 1, wherein: the planar tip is of a two-dimensional geometry having at least one corner remote from the cantilever, which corner during use contacts a surface to be scanned.

3. The probe configuration according to claim 2, wherein: the planar tip is triangular shaped.

4. The probe configuration according to claim 2, wherein: at least the remote corner of the planar tip is covered with a diamond layer.

5. The probe configuration according to claim 4, wherein: the planar tip and the cantilever are formed of the same material.

6. The probe configuration according to claim 1, wherein: the planar tip is formed of diamond.

7. The probe configuration according to claim 6, wherein: diamond nano-crystallites protrude from the diamond surface.

8. The probe configuration according to claim 6, wherein: the diamond layer is boron-doped.

9. The probe configuration according to claim 1, wherein the cantilever further comprises:
a mirror on a major surface thereof, the mirror having a reflecting surface perpendicular to the major surface and perpendicular to the longitudinal direction of the cantilever.

10. The probe configuration according to claim 1, wherein the corner comprises a diamond nanocyrstal which is configured to contact the surface to be scanned.

11. The probe configuration according to claim 10, the nanocyrstal has an apex height of a sub-nanometer dimension.

12. A method of forming an atomic force microscopy probe configuration, comprising a cantilever and a planar tip attached to a sidewall of the cantilever and extending along a longitudinal direction thereof, the method comprising:
forming a planar diamond layer on a flat substrate;
patterning the planar diamond layer in a two-dimensional geometry having at least one corner so as to form a planar probe tip, the probe tip having a substantially planar bottom surface and a substantially planar top surface substantially parallel with the bottom surface, the bottom surface having a corner which is configured to contact a surface to be scanned, the top and bottom surfaces of the probe tip having substantially the same two-dimensional geometry and substantially the same size;
releasing the planar tip from the flat substrate; and attaching the released planar tip to a sidewall of the cantilever such that the at least one corner is remote from the cantilever.

13. The method according to claim 12, further comprising:
forming on the flat substrate a layer of a material which can be etched at least selectively to diamond,
wherein the releasing of the planar tip comprises underetching the patterned diamond layer by etching the selectively removable layer.

14. The method according to claim 12, wherein the forming of the planar diamond layer comprises:
forming on the flat substrate a pattern of nanometer-sized diamond particles; and
growing a diamond layer using these diamond particles as seeds,
wherein the forming of the planar tip comprises patterning the diamond layer such that the at least one corner is located at the location of one diamond particle.

15. The method according to claim 12, further comprising:
forming a mirror on a major surface of the cantilever, the mirror having a reflecting surface perpendicular to the major surface and perpendicular to the longitudinal direction of the cantilever.

16. The atomic force microscopy probe configuration formed by the method according to claim 12.

17. A method of forming an atomic force microscopy probe configuration, the method comprising:
forming a planar layer on a flat substrate;
patterning the planar layer to form a planar probe tip, the probe tip having a substantially planar bottom surface and a substantially planar top surface substantially parallel with the bottom surface, the bottom surface having a corner which is configured to contact a surface to be scanned, the top and bottom surfaces of the probe tip having substantially the same two-dimensional geometry and substantially the same size;
releasing the planar tip from the flat substrate; and
attaching the released planar tip to a sidewall of a cantilever such that the planar tip extends along a longitudinal direction of the cantilever.

18. The atomic force microscopy probe configuration formed by the method according to claim 17.

19. The method according to claim 17, wherein the planar tip is triangular shaped.

20. The method according to claim 17, wherein the planar tip is of a two-dimensional geometry having at least one corner configured to contact a surface to be scanned during use, wherein the planar tip is attached to the cantilever such that the corner is remote from the cantilever.

21. The method according to claim 20, wherein the corner of the planar tip is covered with a diamond layer.

22. The method according to claim 17, further comprising:
forming a mirror on a major surface of the cantilever, the mirror having a reflecting surface perpendicular to the major surface and perpendicular to the longitudinal direction of the cantilever.

23. A probe comprising:
a cantilever having a main surface designed to face a surface to be scanned; and
a probe tip attached to the cantilever, the probe tip having a substantially planar bottom surface and a substantially planar top surface substantially parallel with the bottom surface, the bottom surface having a corner which is configured to contact a surface to be scanned, the bottom surface of the tip being substantially parallel to the main surface of the cantilever, the top and bottom surfaces of the probe tip having substantially the same two-dimensional geometry and substantially the same size.

* * * * *